United States Patent
Dupe et al.

(10) Patent No.: US 11,774,465 B2
(45) Date of Patent: Oct. 3, 2023

(54) MEASUREMENT DEVICE WITH SUSPENDED SENSORS

(71) Applicant: Airbus Operations (S.A.S.), Toulouse (FR)

(72) Inventors: Nicolas Dupe, Toulouse (FR); Nicolas Jean, Toulouse (FR); Cyrille Dajean, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 59 days.

(21) Appl. No.: 17/705,569

(22) Filed: Mar. 28, 2022

(65) Prior Publication Data
US 2022/0317144 A1    Oct. 6, 2022

(30) Foreign Application Priority Data
Mar. 30, 2021 (FR) ..................... 2103283

(51) Int. Cl.
*G01P 5/14* (2006.01)
(52) U.S. Cl.
CPC ..................... *G01P 5/14* (2013.01)
(58) Field of Classification Search
CPC .......................................... G01P 5/14
See application file for complete search history.

(56) References Cited

U.S. PATENT DOCUMENTS

| | | | | |
|---|---|---|---|---|
| 5,874,671 A | * | 2/1999 | Lopez | G01D 11/30 73/178 R |
| 6,662,647 B2 | * | 12/2003 | Schoess | G01P 13/025 73/170.02 |
| 2011/0146425 A1 | | 6/2011 | Furey et al. | |

FOREIGN PATENT DOCUMENTS

| | | |
|---|---|---|
| CN | 113636523 A * | 11/2021 |
| DE | 3703697 A1 * | 8/1987 |
| EP | 0 813 049 A1 | 12/1997 |
| EP | 1 190 924 A2 | 3/2002 |
| WO | WO 2015/091991 A2 | 6/2015 |

OTHER PUBLICATIONS

French Search Report for Application No. 2103283 dated Nov. 29, 2021.

* cited by examiner

*Primary Examiner* — Jamel E Williams
(74) *Attorney, Agent, or Firm* — KDW Firm PLLC

(57) ABSTRACT

To simplify architecture of a measurement device for affixing to a wall of a moving object or stationary object located in a flow, a device includes a support having compartments with an opening that opens to the exterior of the support at the free face in which sensors are housed, the support having a free face and a face to come into contact with the wall, the free face being opposite the face. The device includes a cavity with a printed circuit board, the compartments including an opening that opens to the exterior of the support in the cavity. The cavity is made in the free face opening into it. The circuit board is upside down in the cavity with the printed face towards the interior of the support. The sensors attached to the circuit board are suspended in the compartments. The unprinted face affords an aerodynamic smooth and planar surface.

9 Claims, 2 Drawing Sheets

MEASUREMENT DEVICE WITH SUSPENDED SENSORS

CROSS-REFERENCE TO RELATED APPLICATION

This application claims priority to French patent application number 2103283 filed on Mar. 30, 2021, the entire disclosure of which is incorporated by reference herein.

TECHNICAL FIELD

The disclosure herein relates to a measurement device suitable for being affixed to a wall of a moving object or of a stationary object located in a flow of fluid to measure physical quantities. More particularly, the disclosure herein applies to the measurement of parameters used to characterize a flow of air at the surface of an aircraft.

BACKGROUND

During flight tests, sensors are mounted on the outer surface of an aircraft to perform various types of measurement. Studying the results makes it possible to understand the behavior of an aircraft in flight and to improve or validate the performance thereof. According to one particular application, it is possible, for example, to detect and locate aerodynamic effects on the aircraft.

Patent application FR3015756 discloses a measurement device comprising a support having compartments provided with an opening that opens to the exterior at the free face of the support in which sensors are provided. The support comprises a cavity made in the face of the support intended to be affixed to a wall which is opposite the free face into which the compartments open and in which a flexible printed circuit board to which the sensors are connected is located. The sensor compartment is closed off by a film: the film affords the measurement device an aerodynamic shape but adds an additional layer for which attachment has to be provided.

SUMMARY

An object of the disclosure herein is to simplify the architecture of a measurement device while ensuring an aerodynamic outer surface that does not disrupt the flow.

To that end, the disclosure herein relates to a measurement device to be affixed to a wall of a moving object or of a stationary object located in a flow comprising a support having compartments in which sensors are housed, the support having a free face and a face that is intended to come into contact with the wall, the free face being the face opposite the face that is intended to come into contact with the wall, the device comprising a cavity in which a printed circuit board is located, the compartments being provided with an opening that opens to the exterior of the support in the cavity, wherein the cavity is made in the free face, that is to say that it opens into same, and wherein the circuit board is arranged upside down in the cavity, that is to say with the printed face towards the interior of the support, the sensors attached to the circuit board being suspended in the compartments.

In this way, the surface in contact with the flow is as smooth and as planar as possible; the number of layers required to constitute the device is also reduced.

The disclosure herein provides at least one of the following optional features, taken individually or in combination.

A breathable microporous film that is permeable to air but impermeable to water and is able to channel electrostatic charge towards the object covers the entirety of the free and lateral faces of the support.

The film is attached to the wall using a double-sided adhesive strip that is conductive in order to channel electrostatic charge.

The film is a woven aluminum material with stitches of microscopic size.

The film is produced as one piece.

The printed circuit board has orifices in line with each cavity.

The disclosure herein also relates to a stationary or moving object having a wall located in a flow provided with at least one measurement device having one or more of the features presented above.

The disclosure herein provides at least one of the following optional features, taken individually or in combination.

The support is attached to the wall using a double-sided adhesive strip made of non-conductive silicone-acrylic.

It is an aircraft.

BRIEF DESCRIPTION OF THE DRAWINGS

Other objects, features and advantages will become apparent from the following description of the disclosure herein, which description is given solely by way of non-limiting example, with reference to the accompanying drawings in which.

DETAILED DESCRIPTION

Figure 1:
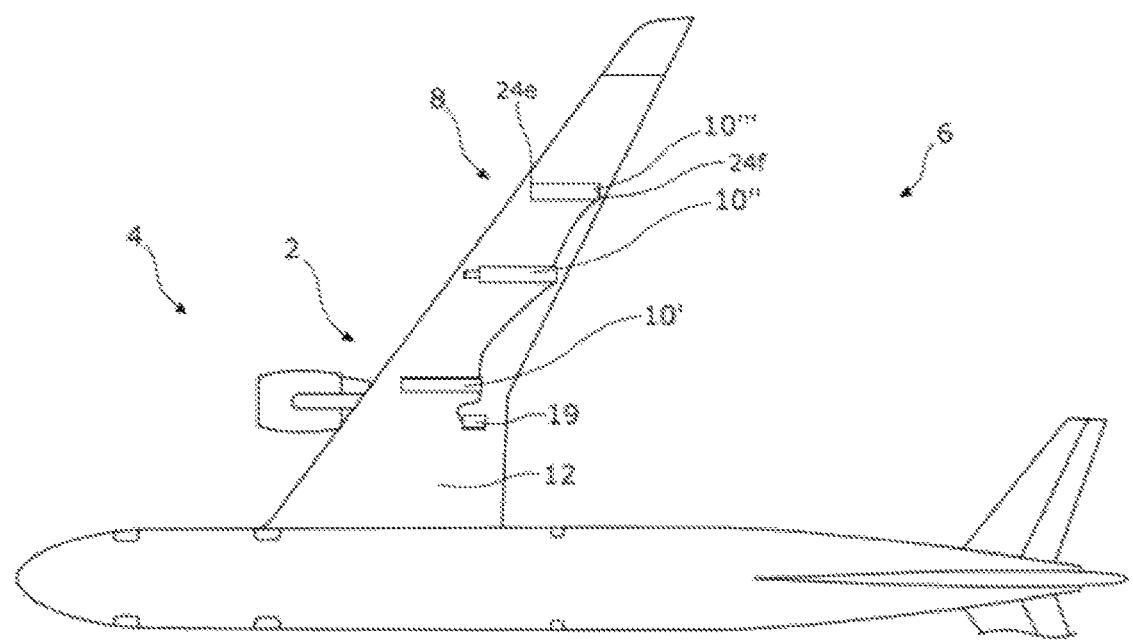
FIG. 1 is a partial view from above of an aircraft, on the wing of which a measurement system according to the disclosure herein is installed.
Figure 2:
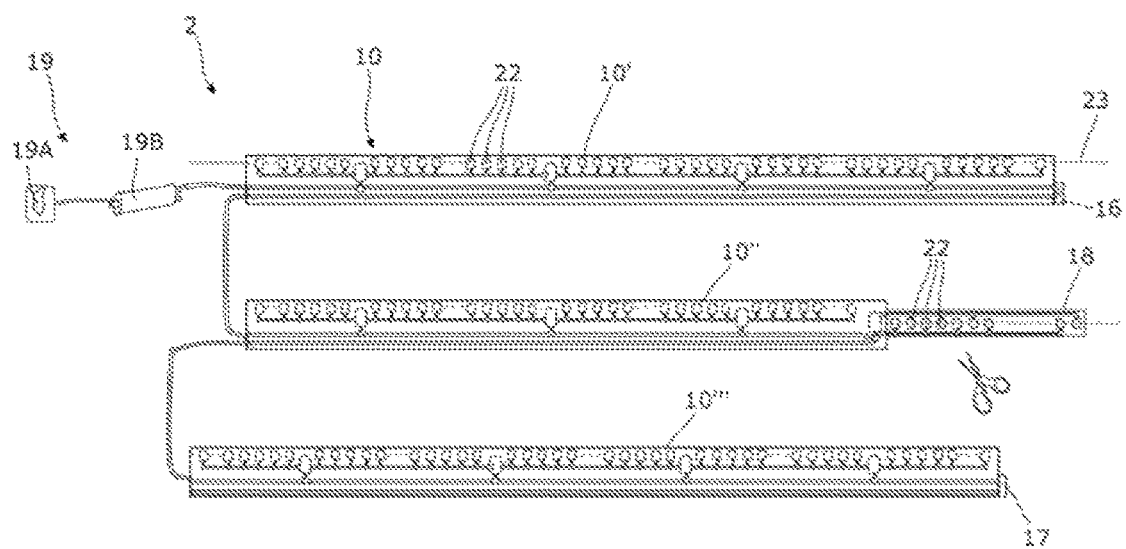
FIG. 2 is a simplified schematic view of the arrangement of electronic components and of the connections between the components according to one embodiment of the measurement system according to the disclosure herein; for the sake of simplicity, not all of the components and connections are shown.

According to one illustrative application shown in FIGS. 1 and 2, the measurement system 2 according to the disclosure herein is installed in a given region 4 of an aircraft 6: in the example illustrated, the system is installed on the wing 8. According to the embodiment illustrated, the system 2 has a number of portions, the third portion being optional. The first portion consists of or comprises a device 10 for measuring various physical quantities which is suitable for being affixed to a wall 12 on the exterior of the aircraft and in the example as seen above on the outer wall of the wing 8 of the aircraft 6. A measurement system 2 may comprise one or more measurement devices 10 denoted in FIGS. 1 and 2 by the references 10', 10", 10''', the measurement devices 10 being connected so as to form a chain of devices allowing measurements to be taken over a large area. The second portion ends a measurement device 10 either in a loopback device 16 or in an end device 17. The loopback device 16 allows the connection to be provided between the open buses of the support as will be seen further on. The end device 17 ends the last measurement device 10 in a chain of measurement devices 10: it comprises an end-of-line impedance allowing the electrical line formed by the succession of measurement devices to be ended. The third portion consists of or comprises an extension device 18 also provided at the end of a measurement device. At the end of a measurement device, there is either a loopback device 16, an end device 17 or an extension device 18. The extension device 18 consists of or comprises a device that, like the measurement device 10, is able to take measurements. However, it does not have all of the features of a measurement device 2: it is cuttable so as to adapt the length of the measurement device 10 with which it is associated to the environment in which it is installed. The fourth portion consists of or comprises a central unit 19 for supplying power to the one or more measurement 10 and extension 18 devices and for acquiring signals from the one or more measurement 10 and extension 18 devices. The power supply and acquisition unit 19 is located either in contact with a measurement device 10 or a certain distance away therefrom. The unit 19 is located inside the aircraft and, in the example illustrated, inside the wing. The unit 19 may be formed of a single block or of several as in the embodiment illustrated in which it comprises a power supply unit 19A and an independent acquisition unit 19B, the units 19A and 19B being connected. Specifically, the power supply unit 19A may be a power source already present on the aircraft. The measurement system 2 comprises, successively, the power supply and acquisition unit 19, one or more measurement devices 10'-10''' and one or more end 16 and/or extension 18 devices. It is the architecture of the measurement device that is of interest here.

Figure 3:
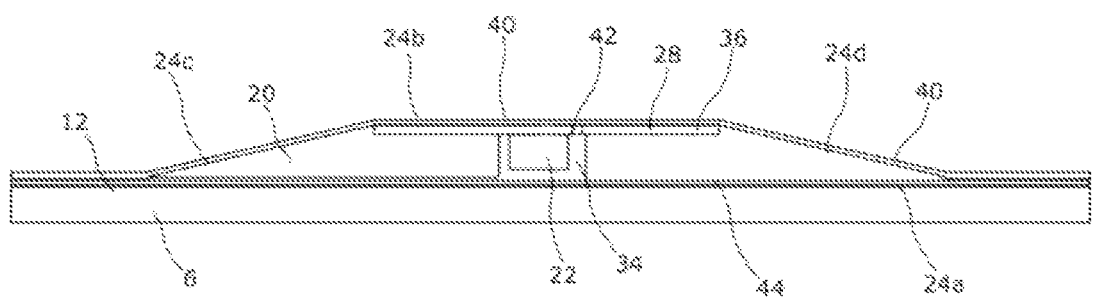
FIG. 3 is a simplified schematic view in cross section of a measurement device of a system according to the disclosure herein.

The measurement device 1 shown in FIG. 3 in cross section takes the form of a flexible support 20 for sensors 22 allowing the contours of the aircraft 6 to be hugged. Each sensor is suitable for measuring physical quantities such as, by way of non-limiting illustration, pressure, temperature, acceleration, mechanical forces, etc. The sensors 22 may be grouped together in units allowing multiple quantities to be measured and, for example, in a microelectromechanical system (MEMS). The MEMS multiparameter measurement units will be referred to as sensors 22 hereinafter. The support 20 acts to provide a fairing for the sensors which therefore do not need any particular envelope and to hold the sensors as close as possible to the wall on which the measurement device is arranged to take the measurements. The support may be made of a polymer material, for example of flexible silicone or polyurethane in order to hug the contours of the aircraft. This material also allows thermal stresses to be absorbed. It may be formed by extrusion, molding, machining or any other known manufacturing method.

The support 20 may take any shape. In the example illustrated in FIG. 3, the support takes an elongate shape of trapezoidal cross section. As mentioned, the support could take any other shape. The sensors 22 are housed in the central portion of the support with the greatest thickness. The support 20 has six faces: A first face 24*a* that is intended to come into contact with the wall of the aircraft—a second, free face 24*b*, parallel and opposite to the face 24*a*, which is intended to be subjected to and located in the flow—two lateral faces 24*c*, 24*d* forming the edges of the support 20. The edges of the support 20 have a decreasing thickness and a triangular shape in cross section (as shown in FIG. 3) so as to provide a surface that only very slightly disrupts the aerodynamic flow—two faces 24*e*, 24*f*, which are visible in FIG. 1, form the ends of the support. One of the faces 24*e* is intended to be connected to a power supply and acquisition unit 19 or to another measurement device 10. The other face 24*f* is intended to be connected to a loopback device 16, an end device 17 or to an extension device 18. Other embodiments with different arrangements are possible as in the patent mentioned above. In one embodiment, the faces 24*e* and 24*f* are parallel to one another; the faces 24*e* and 24*f* are orthogonal to the faces 24*a* and 24*b*. In this way, the measurement devices may be affixed by their faces 24*e* and 24*f* to loopback, extension or end devices more easily. As mentioned above, the support 20 may take any shape: thus, the faces 24*e* and 24*f* might not be planar, but chamfered, or even, for example, take a complex shape. The shape of the face 24*f* should be such that it allows it to be straightforwardly and easily connected to the corresponding connecting face of the loopback, extension or end device.

The support 20 may accommodate a plurality of sensors 22. The sensors 22 are distributed uniformly or non-uniformly over all or part of the length of the support 20. According to one embodiment of the disclosure herein, the sensors 22 are distributed uniformly. Each sensor 22 is separated from the neighboring sensor by a distance that prevents any interference in their operation. As shown in FIG. 2, the sensors 22 are, for example, arranged on the same line 23 parallel to the longitudinal direction of the support 20. Compartments 34 are provided in the support 20 to accommodate the sensors 22: each compartment 34 accommodates one sensor 22. The shape of the compartment 34 corresponds to that of the sensors so that the compartment hugs the contours of the sensor intended therefor without touching it. The compartment 34 passes through the support 20 transversally and opens onto the face 24*a* that is intended to be applied against a wall. According to one possible embodiment, the compartments 34 are made by laser cutting.

As illustrated in FIG. 3, the support 20 has a cavity 36 made in the free face 24*b* opposite that which is intended to be in contact with the wall of the aircraft. The compartments 34 for the sensors open into the cavity 36. The cavity 36 accommodates a flexible printed circuit board 28 (commonly called a flex PCB or just flex circuit). The cavity 36 has a shape corresponding to that of the circuit board 28 and hugs the shapes of this circuit board. In the example illustrated, the circuit 28 is elongate in shape in keeping with that of the support 20. In the measurement devices 10, the circuit board 28 opens onto the side of the face 24*b* of the support 20 opposite that intended to be affixed to the wall of the aircraft. In the embodiment illustrated, the circuit board 28 also opens onto the faces 24*e* and 24*f*. The circuit board 28 and the support 20 run in the same longitudinal direction. The thickness of the cavity 36 is such that the free surface of the circuit board 28 is flush with the surface of the support 20 opposite that intended to come into contact with the wall of the aircraft. The circuit board 28 is arranged upside down in the support 20, that is to say with the printed face towards the interior of the support and the planar and smooth opposite face towards the exterior. In this way, the support 20 and the circuit board 28 form one and the same planar, smooth and flexible aerodynamic surface allowing flow disturbance to be kept to a minimum. The sensors 22 are soldered to the circuit board 28 on the side of the printed face and when the circuit board 28 is inserted into the support, the sensors 22 are suspended in the compartments 34 and, as a result, nothing can interfere with the measurements.

The cavity 36 is covered and closed off by a protective film 40 or membrane. The protective film 40 completely and perfectly covers the free 24*b* and lateral 24*c*, 24*d* faces of the support without exceedance. In the embodiment illustrated, the film 40 is rectangular in shape. It is a breathable microporous film that is permeable to air but impermeable to water. It may be supplied in rolls and thus as a single film in one piece, which covers the desired total area. The film 40 is made of an antistatic material allowing electrostatic charge, which may build up as a result of air friction, to be conducted towards the fuselage of the aircraft which is coated with a slightly conductive paint. In the embodiment illustrated, the protective film 40 is made of aluminum. It is an aluminum microweave: because it is in a woven form, it allows air through but the stitches of microscopic size hold back water. The film is flexible enough to follow the contours of the aircraft along with the support. The film 40 is attached to the support 20 and to the wall 12 using a double-sided adhesive strip that is conductive in order to channel electrostatic charge or any equivalent means. In addition, by covering all of the surface subjected to the flow, the film 40 affords the device 10 an aerodynamic surface.

The circuit board 28 has at least one orifice 42 in line with each compartment 34 allowing the inlet of pressure required for some types of sensors and allowing air to pass between the air flow outside the device 10 located in the vicinity of the wall to which the device is affixed and the sensor 22. The orifice 42 is located between the sensor 22 and the walls of the compartment 34 in which the sensor is located. Specifically, some sensors, the pressure sensor for example, require openings to the air flow allowing them to detect the difference in pressure created by the flow. These openings constitute pressure inlets. The orifices 42 are distributed over the film in the same way as the sensors so that each sensor 22 has a pressure inlet to allow it to take its measurements. By making the orifice 42 in the printed circuit board (outside of any track, component or other element of the circuit board), there is no deformation like in the known architectures providing multiple orifices in a flexible membrane: the circuit board affords rigidity allowing any deformation that might interfere with the pressure inlet to be avoided.

The support 20 is attached to the wall to be characterized by any type of known means and, for example, using a double-sided adhesive strip 44 made of non-conductive silicone-acrylic.

The disclosure herein is not limited to the aerospace field. The measurement system according to the disclosure herein could be used in many other technical fields and, for example, in the fields of space, air, land or sea vehicles. It may also be used on a stationary object placed in an air flow such as, for example, part of a vehicle being tested in a wind tunnel. It may also be used to characterize a wind tunnel by affixing the measurement device to one or more walls thereof.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A measurement device for being affixed to a wall of a moving object or of a stationary object located in a flow comprising a support having compartments in which sensors are housed, the support having a free face and a face for coming into contact with the wall, the free face being opposite the face, the device comprising a cavity comprising a printed circuit board, the compartments comprising an opening that opens to an exterior of the support in the cavity, wherein the cavity opens into the free face, and wherein the circuit board is upside down in the cavity with the printed face towards an interior of the support, the sensors attached to the circuit board being suspended in the compartments.

2. The device according to claim 1, wherein a breathable microporous film that is permeable to air but impermeable to water and is able to channel electrostatic charge towards the object covers an entirety of the free and lateral faces of the support.

3. The device according to claim 2, wherein the film is attached to the wall using a double-sided adhesive strip that is conductive to channel electrostatic charge.

4. The device according to claim 2, wherein the film is a woven aluminum material with stitches of microscopic size.

5. The device according to claim 2, wherein the film is one piece.

6. The device according to claim 1, wherein the printed circuit board has orifices in line with each cavity.

7. A stationary or moving object having a wall located in a flow provided with at least one measurement device according to claim 1.

8. The object according to claim 7, wherein the support is attached to the wall using a double-sided adhesive strip made of non-conductive silicone-acrylic.

9. The object according to claim 7, wherein the object is an aircraft.

* * * * *